(12) United States Patent
Earlenbaugh

(10) Patent No.: US 11,212,970 B1
(45) Date of Patent: Jan. 4, 2022

(54) GROWING SYSTEM AND METHOD

(71) Applicant: Fleurish Farms Inc., San Francisco, CA (US)

(72) Inventor: Joshua Earlenbaugh, Santa Rosa, CA (US)

(73) Assignee: Bloomkeep Inc., Park City, UT (US)

( * ) Notice: Subject to any disclaimer, the term of this patent is extended or adjusted under 35 U.S.C. 154(b) by 179 days.

(21) Appl. No.: 16/704,316

(22) Filed: Dec. 5, 2019

Related U.S. Application Data

(60) Provisional application No. 62/776,703, filed on Dec. 7, 2018.

(51) Int. Cl.
    *A01G 9/24*     (2006.01)
    *A01G 7/04*     (2006.01)

(52) U.S. Cl.
    CPC .............. *A01G 9/249* (2019.05); *A01G 7/045* (2013.01)

(58) Field of Classification Search
    CPC ................................ A01G 9/249; A01G 7/045
    See application file for complete search history.

(56) References Cited

U.S. PATENT DOCUMENTS

| | | | |
|---|---|---|---|
| 4,509,825 A | 4/1985 | Otto et al. | |
| 5,461,496 A | 10/1995 | Kanada et al. | |
| RE36,496 E | 1/2000 | Sutton | |
| 6,256,947 B1 | 7/2001 | Grubb | |
| 7,322,156 B1 | 1/2008 | Rillie | |
| 7,621,081 B2 | 11/2009 | Rillie | |
| 7,954,281 B2 | 6/2011 | Jaster | |
| 8,520,305 B2 | 8/2013 | Suzuki et al. | |
| 8,982,467 B2 | 3/2015 | Paul | |
| 9,445,551 B2 | 9/2016 | Chapman | |
| 2017/0034895 A1 | 2/2017 | Vogel | |
| 2017/0202155 A1* | 7/2017 | Iwai | .................... H01L 31/0488 |
| 2017/0223904 A1* | 8/2017 | Raccanello | ............ A01G 7/045 |

OTHER PUBLICATIONS

Emily Earlenbaugh, "Sun Grown Indoor", The Daily Dope (Tech Thursday) Apr. 14, 2016.
Nebula Haze, "Complete Cannabis Grower's Shopping List", GrowWeedEasy, retrieved Aug. 23, 2017.
Nebula Haze, "How Does the Color Spectrum Affect Growing Marijuana Plants?", GrowWeedEasy, retrieved Aug. 23, 2017.
Andrew Tarantola, "How to Choose the Right Grow Light", GIZMODO, Apr. 20, 2012.
Sirius J, "Light Deprivation, the Science", www.HighTimes.com Jun. 6, 2016.

(Continued)

*Primary Examiner* — Monica L Barlow
(74) *Attorney, Agent, or Firm* — Edward S. Sherman

(57) ABSTRACT

In indoor growing system uses roof mounted solar collector tubes that are supplemented with red and blue light emitting LED's. The LED intensity and intensity ratio is modulated in response to the chromatic variations in the solar energy reaching the plants that occurs season, time of day and weather conditions to optimize plant growth as well as product yield and quality. The LED intensity and intensity ratio is also temporally modulated in accordance with a plants growing cycle. The system enables space intensive agriculture with lower power and water usage, while producing higher quantity and quality output.

18 Claims, 14 Drawing Sheets

(56) References Cited

OTHER PUBLICATIONS

Sirius Fourside, "Stealth growing: how to NOT get Caught Growing Weed", GrowWeedEasy, retrieved Aug. 23, 2017.
Janine S. Croser et al., Time to flowering of temperate pulse in vivo and generation turnover in vivo-in vitro of narrow-leaf lupin accelerated by low red to far red ration and high intensity in the far red region: Plant Cell, Tissue and Organ Culture, vol. 127, Issued 3, pp. 591-599, Dec. 2016.
Heliospectra, LX602C, Technical Specification, retrieved from www.heliospectra.com on Sep. 1, 2017.
Fluence Bioenginerring, VYPRX Specifications, retrieved from www.fluence.science/VYPR on Sep. 1, 2017.
Solatube, "Solatube (R) Skyvault(R) Series, Big tubes for big spaces", retrieved from www.solatube.comon Sep. 1, 2017.
Heliospectra, "Growing Cannabis 101 with the Heliospectra LX60 Series", retrieved from www.heliospectra.com on Aug. 25, 2017.
Heliospectra, "Growing Medical Marijuana? Choose Your LED Grow Lights in Two Steps", retrieved from www.heliospectra.com/blog on Aug. 25, 2017.
Heliospectra,"Heliospectra LED Grow Light Products, Introducing Cortex",retrieved from www.heliospectra.com/led_grow_light_products on Aug. 25, 2017.

* cited by examiner

FIG. 2A
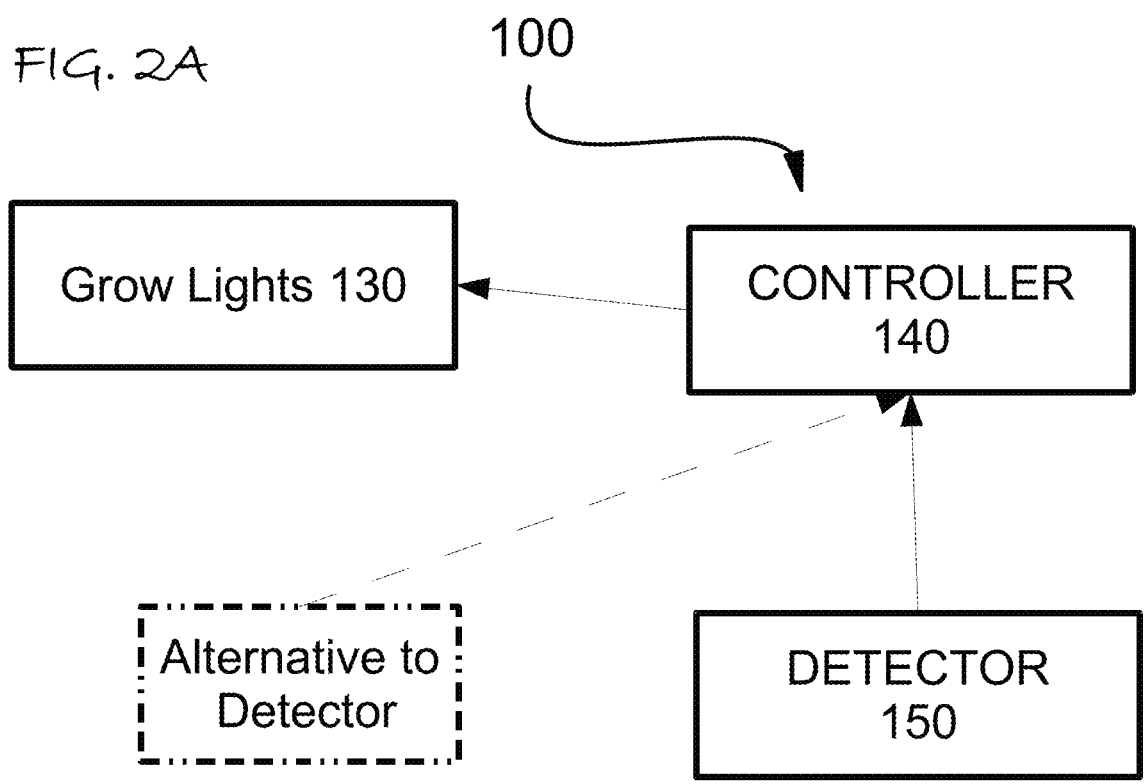
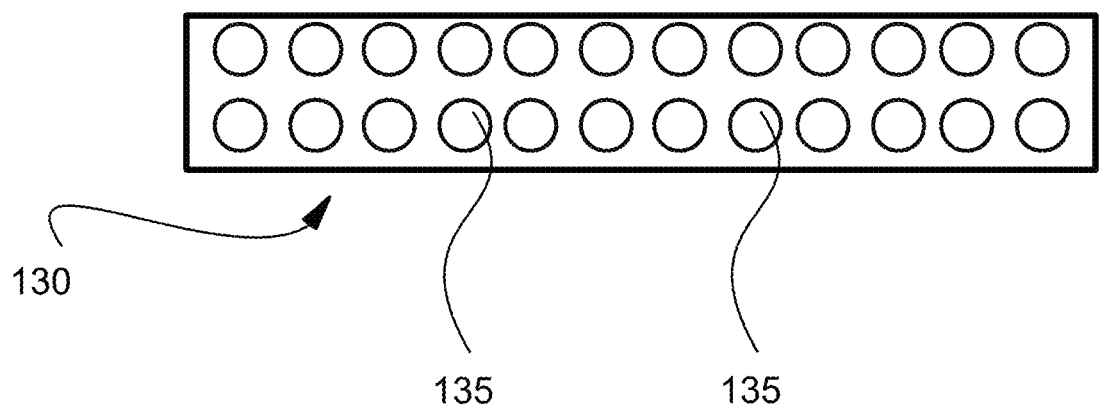
FIG. 2B

GROWING SYSTEM AND METHOD

CROSS REFERENCE TO RELATED APPLICATIONS

The present application claims the benefit of priority to the US Provisional patent application having Ser. No. 62/776,703 that was filed on Dec. 7, 2018, and is incorporated herein by reference.

BACKGROUND OF INVENTION

The field of invention is the indoor cultivation of plants, and systems and methods for growing plants indoors.

Indoor cultivation of plants is attractive for the possibilities of year round horticulture as well as controlled growth conditions, excluding inclement weather and crop damage from rain, hail and the like, as well as insects and animals. Indoor cultivation in dryer climates requires less water for successful cultivation where irrigation would be required for outdoor cultivation of the same plants.

Indoor cultivation requires either greenhouses that admit solar radiation or the use of grow lamps that simulate the solar spectrum.

However, the energy requirements to power such grow lamps are considerable, raising the cost of indoor cultivated products. Greenhouses are expensive to heat in winter climates, and the available sunlight in the winter may be insufficient for many crops.

It is an object of the invention to enable year round cultivation of plants indoors at high yields and quality, yet with reduced energy consumption to maintain the indoor climate, as well as to power grow lamps.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a plant growth environment comprising a structure with vertical sides and a roof spanning the sides, where a portion of space between the vertical sides and the roof provides an interior volume for plants to grow, a plurality of solar collection tubes mounted in the roof for collecting sunlight and directing the sunlight downward into the interior volume, a plurality of grow lamps that deploy multiple light emitting diodes (LED's) that are configured to illuminate the interior of the volume to supplement the sunlight directed into the interior volume by the solar collection tubes, in which the grow lamps are disposed between adjacent solar collection tubes to illuminate plants placed generally under the solar collection tubes, a controller operative to energize the LED's in response a fluctuations the sunlight delivered to the plants by the solar collection tubes and a target energy spectrum desirable for the growth of the plants over stages of plant and fruit or flower development.

A second aspect of the invention is characterized by such a plant growth environment further comprising one or more detectors that measure the sunlight intensity and the controller is in signal communication with the one or more detectors.

Another aspect of the invention is characterized by any such plant growth environment wherein at least one detector is within the interior volume.

Another aspect of the invention is characterized by any such plant growth environment in which a first portion of the plurality of grow lamps have LED's that emit white light and a second portion of the plurality of grow lamps have a combination of LED's that emit blue light and LED's that emit red light.

Another aspect of the invention is characterized by any such plant growth environment wherein each grow lamp having white LED's is configured to illuminate 2 immediately adjacent plants.

Another aspect of the invention is characterized by any such plant growth environment wherein each grow lamp having a combination of LED's that emit blue light and LED's that emit red light are configured to illuminate 4 adjacent plants.

Another aspect of the invention is characterized by any such plant growth environment wherein each grow lamp having a combination of LED's that emit blue light and LED's that emit red light are configured to illuminate 4 adjacent plants.

Another aspect of the invention is characterized by any such plant growth environment wherein the second portion of the plurality of grow lamps that have a combination of LED's that emit blue light and LED's that emit red light include LED's that emit have deep red light and far red light LED's.

Another aspect of the invention is characterized by any such a plant growth environment 4 wherein each grow lamp having white LED's is configured as at least one linear array of white LED's.

Another aspect of the invention is characterized by any such plant growth environment wherein the solar collection tubes are operative to reject a substantial portion of the infrared radiation in the sunlight and direct the visible light radiation of the sunlight into the interior volume.

Another aspect of the invention is characterized by any such plant growth environment wherein the controller is operative to modulate a ratio of the intensity of the blue and red light emitted by the respective blue and red LED's in response to one or more of a change in time, a change in date and a wavelength dependent attenuation of the sunlight directed downward into the interior volume.

Another aspect of the invention is characterized by any such plant growth environment wherein one or more grow lamps are disposed to illuminate an interior of the one or more solar collection tubes.

Another aspect of the invention is characterized by any such plant growth environment wherein the grow lamps are transportable within the structure in response to an output of the controller.

Another aspect of the invention is characterized by any such plant growth environment wherein the grow lamps comprise LED's that emit blue, red and white light.

Another aspect of the invention is characterized by any such plant growth environment wherein the controller is operative to modulate a ratio of intensity of the blue, red and white emitted by the LED's in response to one or more of a change in time, a change in date and a wavelength dependent attenuation of the sunlight directed downward into the interior volume.

Another aspect of the invention is characterized by any such plant growth environment wherein one of grow lamps and LED's are disposed to illuminate the interior of the one or more solar collection tubes.

Another aspect of the invention is characterized by any such plant growth environment wherein each grow lamp having white LED's is configured as at least one linear array of white LED's.

Another aspect of the invention is characterized by any such plant growth environment wherein the grow lamp having white light emitting LED's are arranged in a first set of rows and the grow lamps having red and blue light emitting LED's are arrange in a second of rows that is interlaced between the first set of rows.

Another aspect of the invention is characterized by a method of growing plants comprising the steps of providing a structure with vertical sides and a roof spanning the sides, where a portion of the space between the vertical sides and the roof provides an interior volume for plants to grow, the structure also comprising one or more solar collection means for collecting exterior sunlight and directing the sunlight downward from the roof into the interior volume, a plurality of grow lamps that deploy multiple light emitting diodes (LED's) that are configured to illuminate the interior of the volume that is illuminated by the sun light from the solar collection means, one or more plants disposed to receive sunlight from the solar collection means and be illuminated the grow lamps, determining the Photosynthetic Photon Flux Density (PPFD) received by the one or more plants from the solar collection means, determining a difference between the PPFD and a predetermined physiological needs of the one more plants, energizing the plurality of grow lamps to illuminate the one or more plants to compensate for the difference between the PPFD and the predetermined physiological needs of the one more plants.

Another aspect of the invention is characterized by such a method of growing plants wherein at least one detector is deployed in the step of determining the PPFD received by the one or more plants from the solar collection means and a controller is operative to energize the plurality of grow lamps in response to the determination of the PPFD received by the one or more plants from the solar collection means.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A is schematic block functional diagram showing the grow lights, controller and measurement means, such as a detector or weather report system, whereas FIG. 2B is a schematic bottom plan view of LED's arrayed in a grow light.

DETAILED DESCRIPTION

Figure 1:
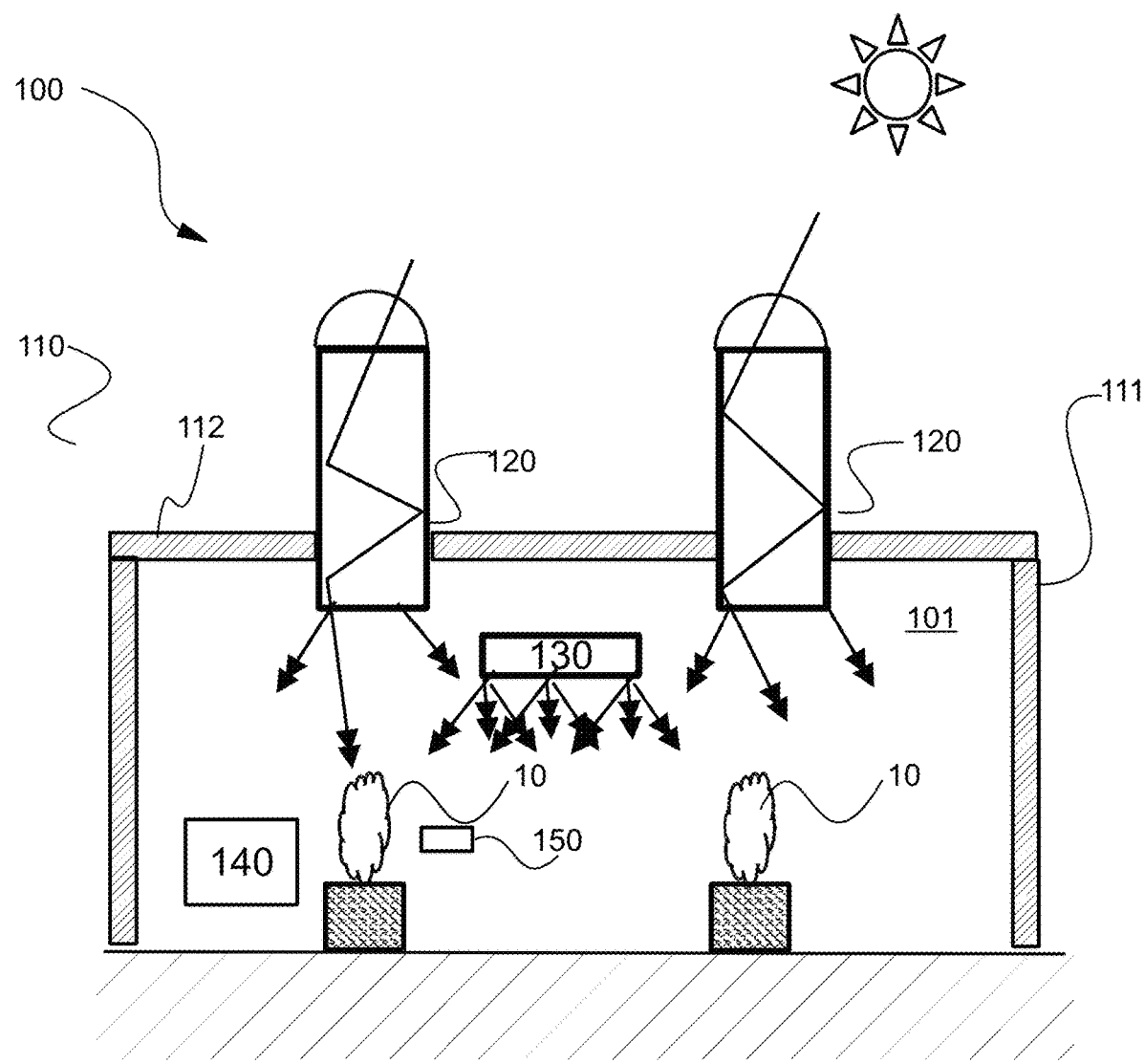
FIG. 1 is a schematic cross sectional elevation view of an exemplary embodiment of the invention in which the daylighting means are solar collection tubes.

Referring to FIGS. 1 through 14, wherein like reference numerals refer to like components in the various views, there is illustrated therein a new and improved Growing System and Method, generally denominated 100 herein.

In many climates it is not possible to grow plants in the winter without either some type of greenhouse or indoor growing facility that uses lamps to replace sunlight. Temperature control is more efficient in indoor growing facilities, which are thus better suited to extreme winter climates than green houses. It is also desirable to grow indoors to conserve water as well as to provide year round horticulture.

While the natural or outdoor growth rates is usually limited by the solar exposure during the day, the plant growth can be enhanced indoors by either supplementing the natural sunlight during the day and/or providing more hours of light from grow lamps, as both the sun and grow lamps provide plant photosynthetic power. Indoor growing facilities offer the opportunity for year round fresh crops, by conducting repetitive growing cycles; starting a new growth "season" after each harvest.

It would be desirable that such repetitive cycles in indoor growing facilities utilize daylight when possible to minimize energy cost.

However, plants have a evolved and adapted to not just the amount of sunlight, but the quality of sunlight, that is the spectral variation in energy density, to with the variation in intensity with wavelength or color of the light. It has been discovered that optimum spectral density for many plants varies with the stage of plant maturity. It has also been discovered that the quality of natural sunlight with respect to spectral density can vary not only with season, but on a daily and sometimes hourly basis due to atmospheric conditions that include haze, clouds, rain, storm and other natural phenomena.

Accordingly, the inventor has come to appreciate that in order to optimize the indoor cultivation of crops year round with a combination of artificial light, such as from light emitting diodes (LED's) and other types of grow lamps, and natural light that enters the indoor cultivation space, such changes of the spectral density need to be considered.

The inventor has also discovered that a combination and spatial arrangement of different grow lights are particularly suited to efficient and economical indoor cultivation with specific solar collection means. By solar collection means we mean a device that collects incident sunlight light from outside a structure that houses the plants and directs the sunlight into the interior of the structure to illuminate or irradiate the plants.

Grow System

Thus, in accordance with an embodiment of the present invention the plant growth system and environment 100 comprises a structure 110 with vertical sides 111 and a roof 112 spanning the sides 111, wherein a portion of the space between the vertical sides 111 and the roof 112 provides an interior volume 101 for plants 10 to grow. The plants 10 can be grown in soil or hydroponic growth media or conditions. One or more solar collection means 120 are deployed for daylighting the interior volume 101, that is collecting sunlight and directing the sunlight downward into the interior volume 101 into the structure to illuminate or irradiate the plants 10. The one or more solar collection means 120 is optional solar collection tubes or solar collection tubes, as well as other day lighting structures.

The interior volume 101 also contains a plurality of grow lamps 130 that are preferably configured of arrays of light emitting diodes (LED's) 135 disposed to illuminate the interior of the volume 101 with supplemental light when the sunlight is of diminished intensity and quality relative to the physiological need at the current stage of the plants 10 growth cycle. The power to the LED's 135 of the grow lamps 130 is modulated by a controller 140. The controller 140 is preferably operative to energize the LED's 135 of the grow lamps 130 when a predetermined decrease of sunlight occurs in the interior volume 101. The controller 140 is preferably operative to selectively address and energize a sub set of the LED's 135 of different grow lamps 130 to control the wavelength dependent distribution of the spectral energy incident on the plants 10. The grow lights 130 can also used to extend the length of the growing day, by being used at night, or make up any decrease in the length of the day and/or the quality of light in the growth cycle that defines a growth season for the current crop of plants. It is desirable to start new growth cycles of fresh plants as soon as possible after the previous plants are harvested.

Grow Lamps

Figure 3:
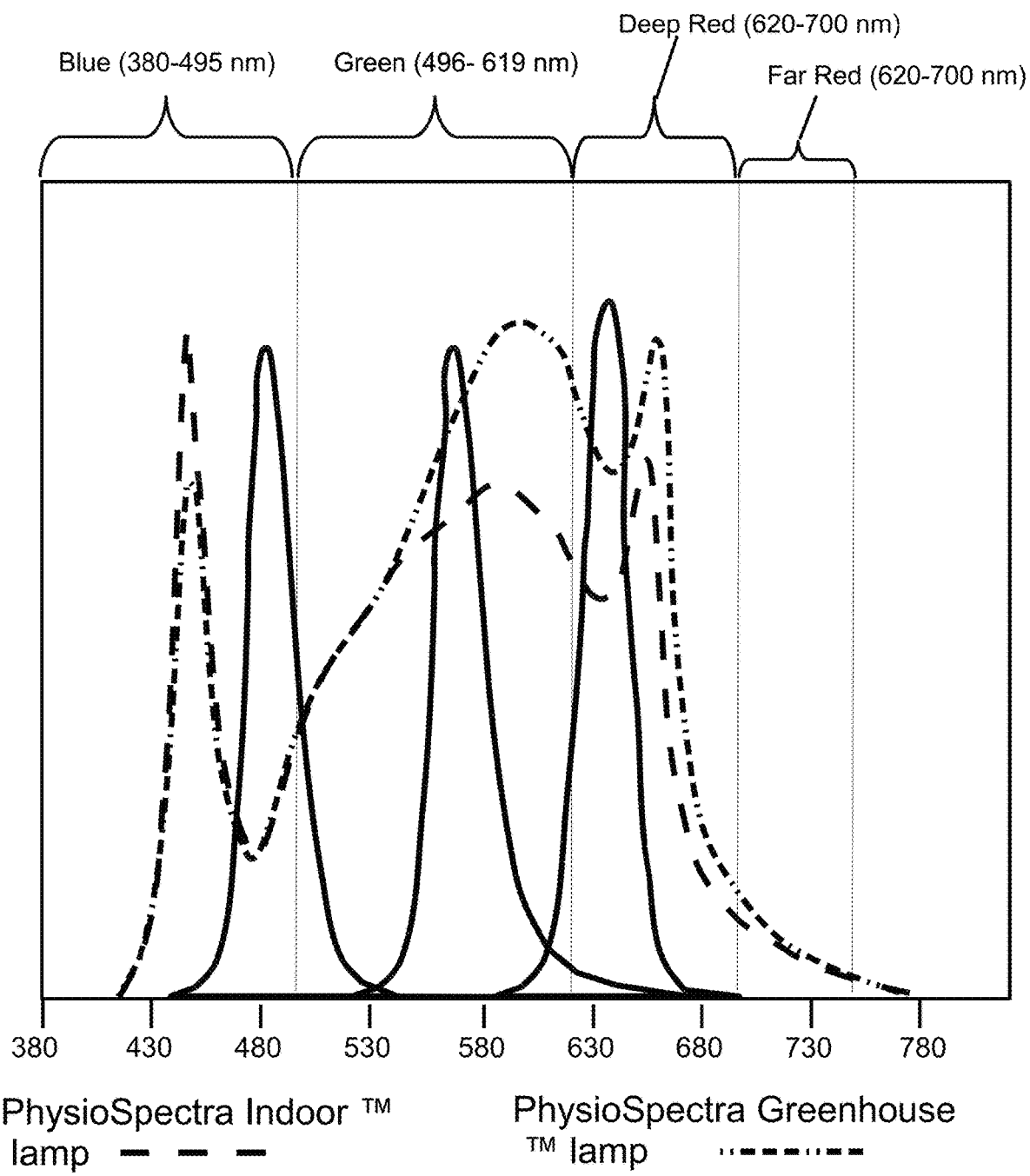
FIG. 3 compares the spectral output of alternative grow lamps that utilize white, blue, green and red light emitting LED's.

FIG. 3 compares the broad spectral range output of white LED's with the narrower output of typical colored LED's that may be used in grow lamps 130. The dashed and dot-dashed lines are the reported spectrum from the manufacture of the VYPRx model (Fluence Engineering Inc.) PhysioSpectra Indoor™ and PhysioSpectra Greenhous™ lamps, which may also be used as a linear array of LED's 135. It should be appreciated that the White light also cover the Green spectral range (about 470 nm to 619 nm), as it includes the entire spectral range of about 450 to 660 nm.

The white light emitting LED's are generally of lower cost for the same light output. Since the white LED's have a broad and high output in the green spectral range (496-619 nm), the other grow lamps 130, may deploy only Red and Blue light emitting LED's, but more preferably Blue, Deep Red and Far Red color emitting LED's, such as to provide the plants a full spectrum of optimal illumination over the growth cycles in the example of Table I.

In preferred embodiments the grow lamps 130 utilize a mixture of different LED's 135 that have different narrow spectral emission ranges as illustrated in FIG. 3, and one or more subsets of the LED's 135 with the same emission spectra are selectively activated by the Controller 140.

Grow lamps 130 devices that utilize arrays of LED's 135 are available from several manufacturers, such as Heliospectra AB (Gothenburg, Sweden) as well as Fluence Engineering Inc. (Austin, Tex.). The arrays may includes LED that emit different colors of light, including a broad spectrum of light to provide what is commonly known as white light. The different LED's 135 in the arrays can be separately energized with controllers. Heliospectra AB provides such a compatible controller for the grow lamps they manufacture.

Accordingly, one such preferred embodiment of the grow light 130 is a Heliospectra™ brand LX602C model. The LXC02C model provide 4 different type of LED's 135 to provide a luminance with 4 optionally discrete color bands, that are characterized by the central wavelength in nanometers (nm) as follows: Red (660 nm), blue (420 nm), infrared (735 nm), and a broad band or white LED's that are characterized by a color temperature of 5500K.

In the more preferred embodiments, the grow lights 130 may utilizes a plurality of different LED's 135 of different color outputs to supplement the solar illumination from one or a combination of solar collections means, such as solar collection tubes 120 that extend above a roof or windows that utilize daylighting structures on walls, to emulate the ideal spectral illumination in sequence with the natural growth cycle of plants, that is from the spring to the fall season, which is generally from after the spring equinox to before the winter equinox.

It is preferable that the grow lights 130 and solar collection means, such as solar collection tubes 120 are interlaced in a matrix so all plants 10 within the structure 110 receive uniform irradiation from the solar collection means 120 and the grow lamps 130 simultaneously. Hence when solar collection tubes 120 are deployed as a solar collection means it is desirable that the grow lights 130 are arranged to spread light between the spaced apart solar collection tubes 120. In a more preferred embodiment of the invention, it is preferable to provide ordered arrays of the solar collection tubes 120 that direct natural sunlight downward to the plants 10 and to dispose grow light arrays between the solar collection tubes, as is illustrated in FIG. 1 and FIG. 4-9.

It may also preferable to deploy a combination of lineal and area arrays of the LED 135 as an ordered array of grow lights 130/130' between the array of solar collection tubes 120, as illustrated in FIG. 5-9. Linear arrays of LED's 130' can be purchased from Heliospectra (Light Bar model) or assembled as illustrated generally in FIG. 3B. The Light bar model has a G type spectral output deploying LED's bulbs Blue (450 nm), Red (660 nm) and White light with a color temperature of 5700K.

Solar Collection

The solar collection means 120 are preferably day lighting type light pipes, which are also known as solar tubes or solar collection tubes 120. Solar collection tubes 120 are similar to skylights or other windows on an at least partially horizontally extending roof of a structure that include an upper transparent region for receiving sunlight. The walls of the tubes 120 below the transparent region have reflective surfaces. These walls generally extend downward a sufficient amount so that sunlight incident on the walls will undergo multiple reflections before exiting the tube to illuminate the interior space. The transparent region of the solar tubes can extend above the roof line to capture sunlight at low angles above the horizon as the sun is rising and setting. However, because of the multiple reflections off the wall of the tube, and optionally other light diffusing elements, the sunlight still enters the interior closer to a vertical orientation as if the sun is closer to its zenith position in the middle of the summer. The multiples reflections with the solar tubes also spread the light vertically as it exits the tube, such that the illumination pattern is generally uniform through the day at the level of the plant canopy.

A preferred type of day lighting type solar collection tubes or solar collection tubes 120, are available from Solatube International, Inc. (Vista, Calif.). Such solar collection tubes 120 penetrate the roof of a structures 110, and may have a light collecting portion that extends above the roof line. The light pipe or solar tubes 120 collect and distributes sunlight downward by multiple reflections on the walls of the tubes 120 or the central portion 121, and to the extent they are spaced apart as they extend above the roof, they do not shadow each other but capture sunlight throughout the day. By shadowing, we mean that for solar collection tubes 120 having collecting portion that extending above a roof line 112, when the sun is at low elevations with respect to the horizon, such as in the morning and late afternoon, the extending portion of the each light pipe 120 does not block the sun on adjacent solar collection tubes 120. When the solar collection tubes 120 extend above the roof 112, this extending portion is preferably transparent to avoid such shadowing. Preferred solar collection tubes 120 capture sunlight throughout the day and may deploy any combination of reflective, refractive and diffractive lens or windows to spread and diffuse of the light that enters the growing space 101. The light pipe 120 are configured or selected to diffuse light to reach plants 10 spaced apart below them and/or the plants may be spaced apart to best utilizes the output provided by the solar collection tubes 120.

Various constructions of such day lighting solar collection tubes are described in the following US Patents, which are incorporated herein by reference: U.S. Pat. No. 6,256,947B1 issued 2001 Jul. 10 for a "Method and apparatus for a tubular skylight system" (Grubb, Dennis); U.S. Pat. No. 8,982,467B2 which issued on 2015 Mar. 17 disclosed a "High aspect ratio daylight collectors (Paul, August Jaster) and U.S. Pat. No. RE036496E issued on 2000 Jan. 18 for a "Skylight" (Sutton, Steven Michael)

It is preferable that the solar tubes 120 diffuse light before or as it enters the interior space 101. This can be accomplished as disclosed in U.S. Pat. No. 7,621,081B2, which issued on 2009 Nov. 24 for a "Skylight tube with reflective film and surface irregularities" (Rillie, David Windsor), which is incorporated herein by reference. The '081 patent discloses a skylight shaft that is coated with a highly reflective film to maximize the amount of light transmitted from the top of the skylight to a room below the skylight. Surface irregularities are formed in the shaft or adhesive that holds the film onto the shaft to diffuse the light and thereby prevent the formation of focal or "hot spots" in the room below.

Other preferred embodiments that may be utilized are disclosed in U.S. Pat. No. 7,954,281B2 for "Skylight tube with infrared heat transfer" issued 2011 Jun. 7 (Jaster, Paul), which is incorporated herein by reference. The '281 patent disclosures a day lighting tube or skylight shaft with a substrate that has a film or coating on its inside surface that reflects visible light while transmitting IR to the tube substrate, which can have a satin black and/or other IR absorbing interior and anodized or other high emissivity exterior to convey heat across the tube so that visible and preferably near infrared light is transmitted down the tube but the longer infrared wavelength that would otherwise heat the interior are absorbed by the tube substrate to minimize heating the illuminated space. The solar collection tubes or solar tubes 120 may be configured to that the father infrared wavelength instead propagate up through the tube and exit through a clear plastic dome covering the tube.

Other operating principles of a daylighting tube are disclosed in U.S. Pat. No. 7,322,156B1 for "Skylight domes with reflectors" (issued 2008 Jan. 29 Rillie, David Windsor), which is incorporated herein by reference. The '156 patent disclosures a skylight cover may include a transparent lens and an opaque reflector attached to the inside of the cover opposite the lens. Light entering the lens can be refracted by the lens so that it reflects off of the reflector and into a tubular skylight assembly. Thus, the amount of light entering the tubular skylight assembly is maximized. The solar tubes 120 can generally diffuse the light emitted into the interior at the same angular distribution over the entire day, as the multiple reflections off the walls of the tube at least somewhat reduce the effect of the solar elevation and direction changing throughout the day. Far infrared sunlight that would adversely heat the interior space can be reflected by so called "hot mirror" that form windows at the top of the solar tubes 120. The "hot mirror" can be designed or selected to transmit visible and near Infrared red light that is desirable for plant growth.

Figure 8:
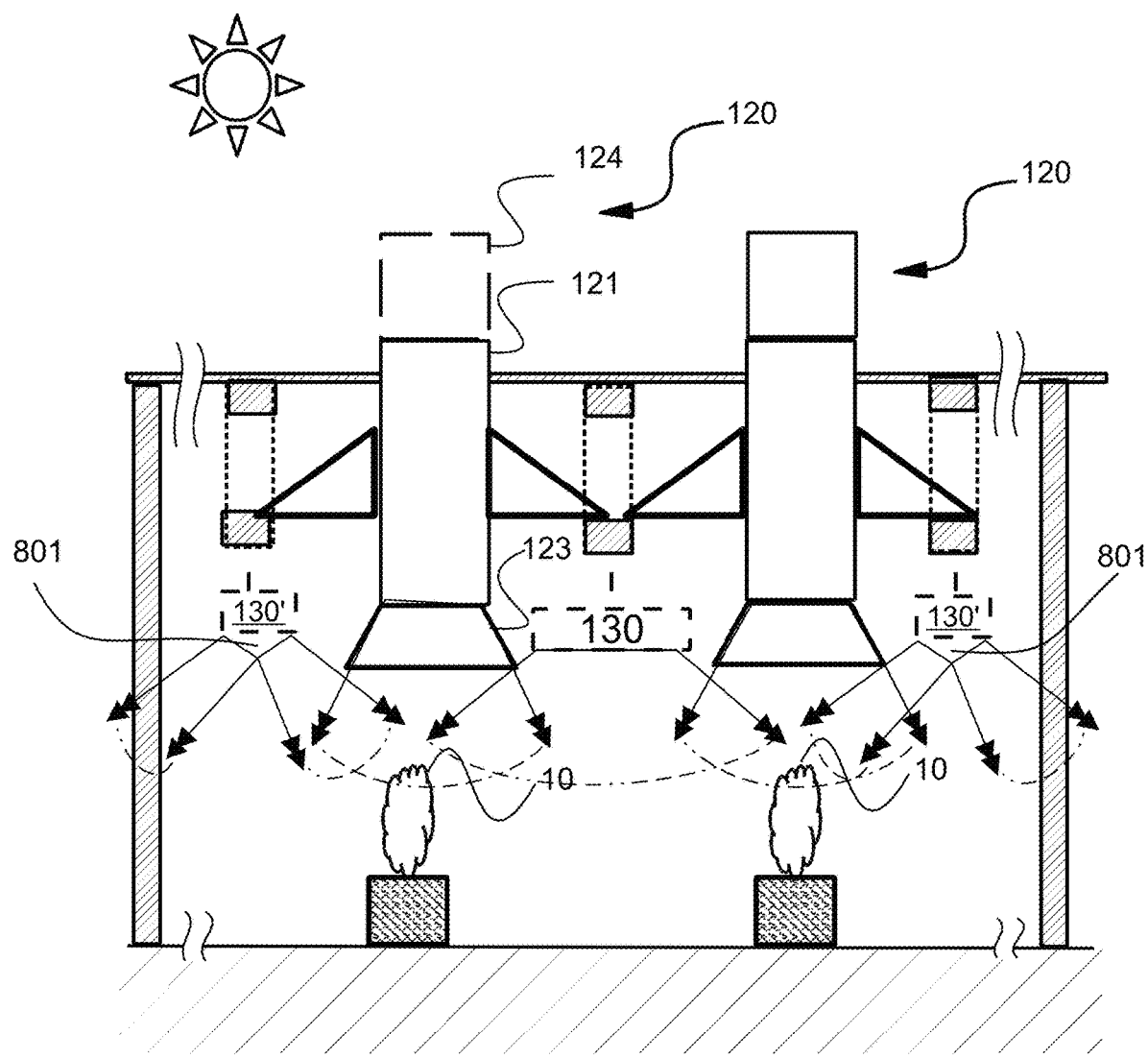
FIG. 8 is a cross-sectional elevation of another embodiment deploying the grow lights and day lighting tubes.

A currently most preferred type of solar collecting means 120 is Solatube brand Skyvault M74 model daylighting tube or light pipe 120 deploys a collector and amplifier. It is preferred due to the IR rejection (as well as UV rejection) and the extra light collection provided by the collector 123 at the top of the central tube portion 121 of the light pipe 120 and the wide spatial and angular diffusion pattern provided by the amplifier 124 at the exit orifice of the central portion 121 of the light pipe 120. While the models standard prismatic filter at the orifice provides even lateral illumination, the illumination patterns of the solar collecting means 130 as well as the grow lamps 130 or 130' may be modified to suite the spatial placement of the plants 10 and the spacing between the grow lamps 130 and the solar collector 120. For example, as illustrated in FIG. 8, the grow lamps 130' may deploy a reflector and/or light diffuser 801 to direct the emitted light in 2 opposing directions to towards the plants 10 placed under nearest neighbor day lighting tubes 120.

Solar collection means can also be any combination of roof mounted solar collection tubes and wall mounted solar collection optical systems, such as daylighting films, glazing, blinds and shutter, as for example that are disclosed in issued the following US patents, of which are all are incorporated herein by reference: U.S. Pat. No. 8,520,305 issued Aug. 27, 2013 (Suzuki, M. et al.); U.S. Pat. No. 5,461,496 issued Oct. 24, 1995 (Kanada. Y. et al.) and U.S. Pat. No. 4,509,825 issued Apr. 9, 1985 (Otto, S. W. et al.). Daylighting films, glazing, blinds and shutter are preferably deployed on south, east and west facing walls of a structure such that low angle sun incident on the glazing on these walls is re-directed upward toward the ceiling, where it is scattered or reflected to diffuse further into the building that nature sunlight would reach entered the same glazing.

Figure 4:
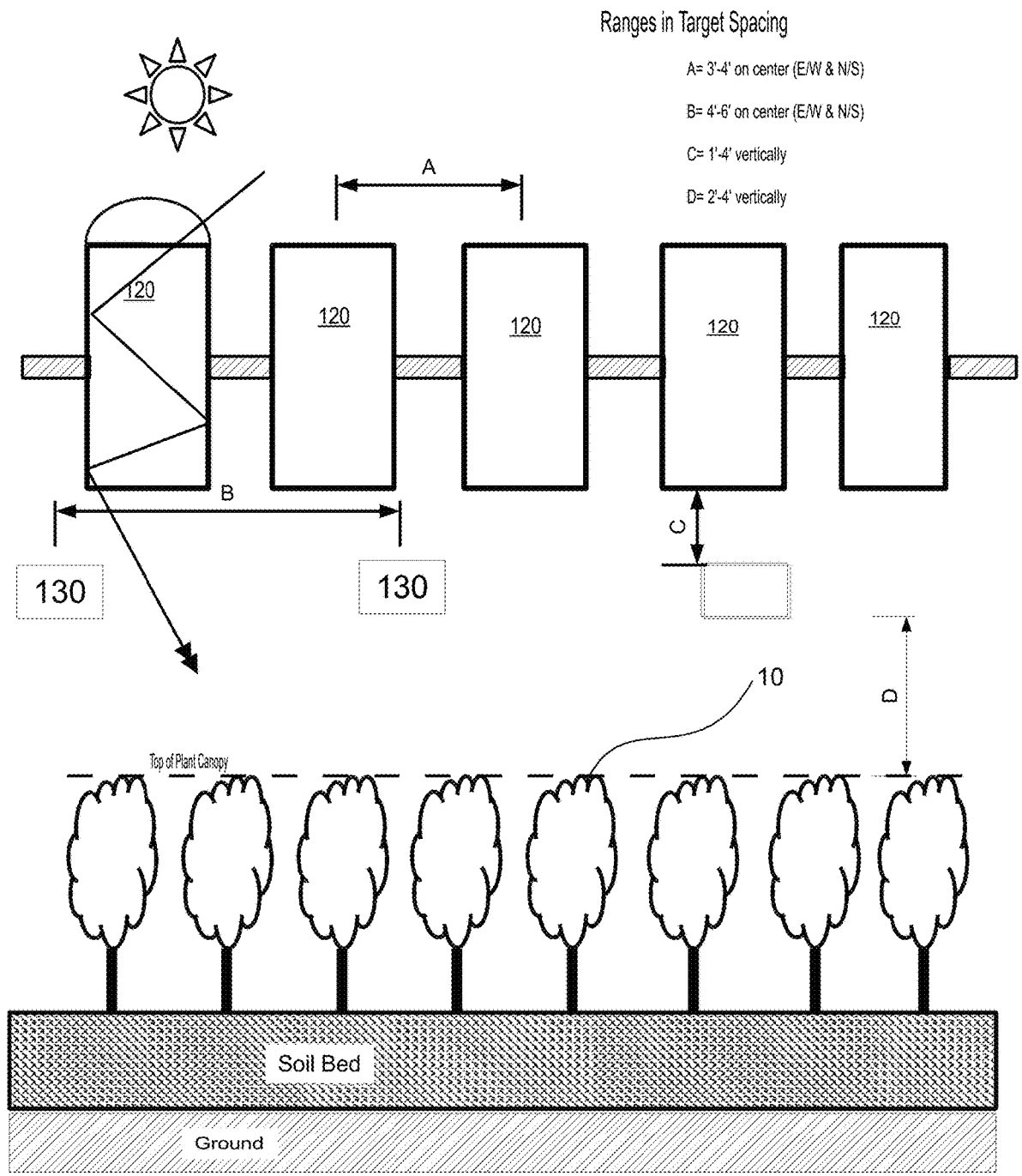
FIG. 4 is a schematic cross-sectional elevation of a preferred embodiment showing a lateral arrangement of grow lights and solar collection tubes.
Figure 5:
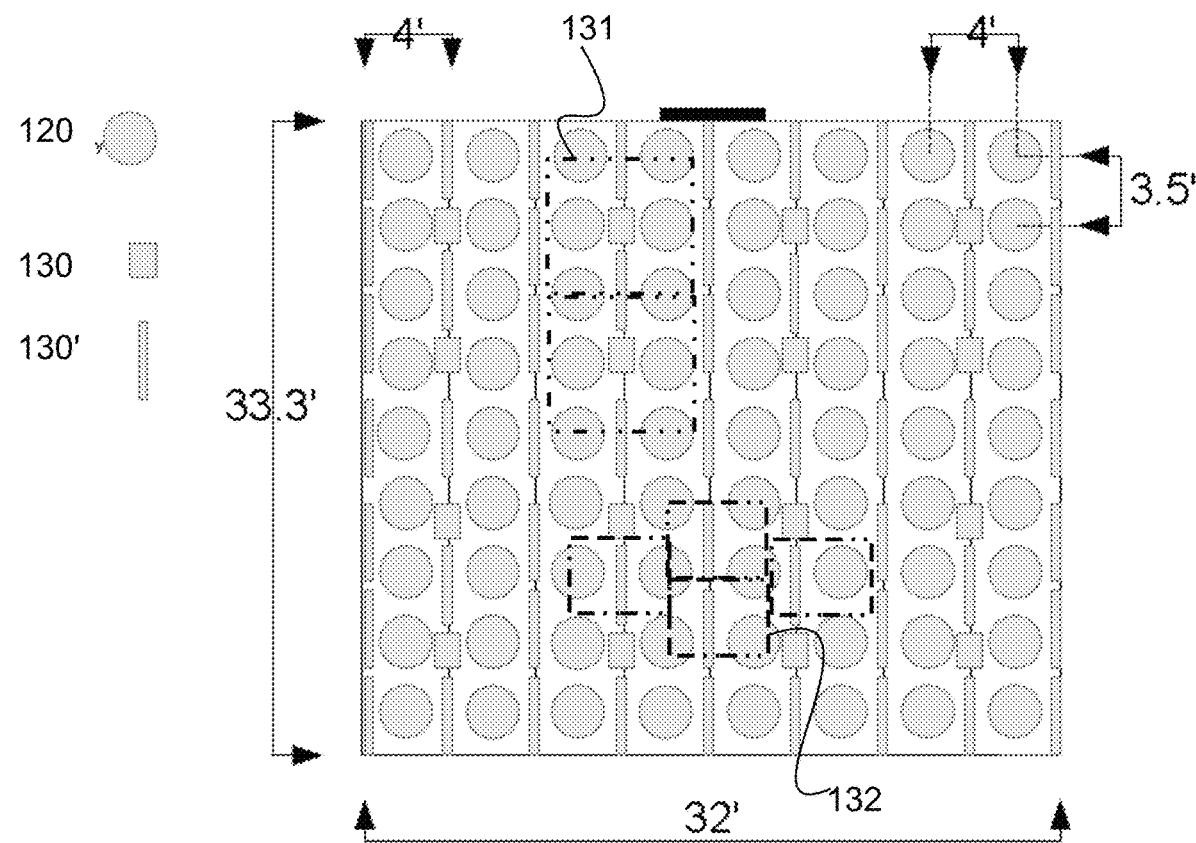
FIG. 5 is a plan view of another preferred embodiment to illustrate a combination of arrayed LED's and solar collection tubes.
Figure 6:
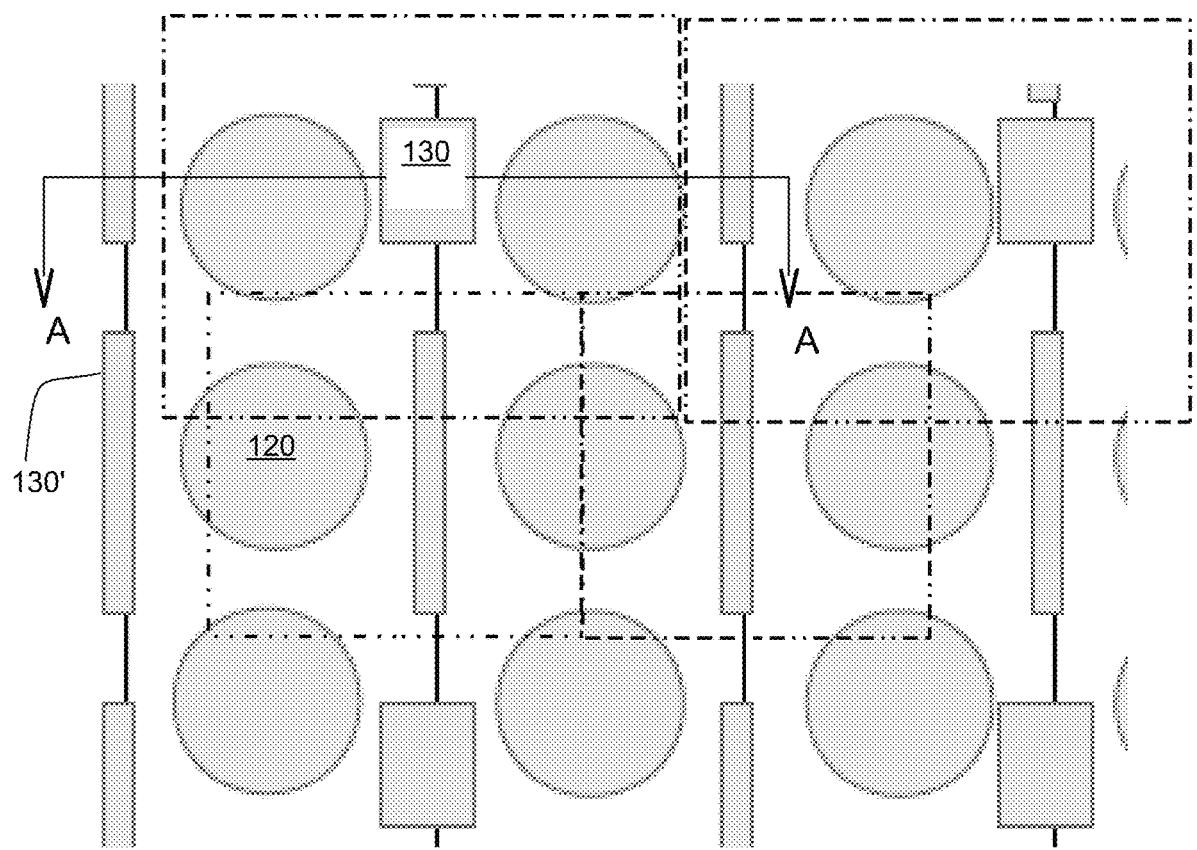
FIG. 6 is an enlarged view of a portion of FIG. 5.

FIG. 4-6 illustrate the presently preferred spacing and distance of solar tubes 120 and LED grow lights 130 with respect to each other and the plants 10 grown in the structures 110. The solar tubes 120 are spaced in a 2-dimensional matrix with about 3.5 to 4 foot center.

The solar tubes 120 have an exit aperture disposed above the grow lights 130 or 130" in which the dispersed light is spread laterally in 2 dimensions. The grow lamps 130 are also spread light laterally, but are at a height and spacing between adjacent solar tubes 120 that they do not block or shadow the light emitted by the solar tubes 120. The grow lamps 130 project the emitted light to adjacent plants 10 that are preferably disposed directly under each of the solar tubes 130. However, for small plants, multiple plants will be disposed in the area illuminated by the sunlight that spreads laterally as it exits each solar tube 120.

Controllers 140 for use with LED bulbs in horticultureal lighting are known, as for example in US Pat. Appl. No. 2017/0034895A1 for "A CONTROLLER FOR A HORTICULTURAL LIGHTING SYSTEM" (issued on 2017 Feb. 2 to Vogel, Jan-Willem), which is incorporated herein by reference.

Further, U.S. Pat. No. 9,445,551B2 is for a "Method and apparatus for using light emitting diodes in a greenhouse setting (issued to Chapman, Kirk on 2016 Sep. 20), which is incorporated herein by reference. The '551 patent discloses a modular LED system is provided that includes a frame having a plurality of light emitting diodes (LEDs) of at least two different colors for generating light within a color spectrum. The LEDs are mounted on or adjacent to a plate equipped with cooling medium for cooling the LEDs. The system includes a processor for controlling an amount of electrical current supplied to the LEDs to determine a color of light generated by the LEDs, and a flat translucent member having translucent lenses for decreasing or increasing the diffusion angle for light emitted from each LED. The system is suitable for illuminating plants to supplement natural light without substantially interfering with the amount of natural light due to its narrow width. The system delivers uniform illumination and reduces energy and maintenance costs. The system may be installed in a commercial greenhouse.

FIG. 4 illustrates several important parameters of the growth environment in which the top of the plant canopy is closer to the grow lamps 130 (distance D) that the bottom of the solar tubes 120. The grow lamps 130 are spaced below the solar tubes 120 by a distance C which is preferably about 4 to 6 ft., and the grow light are separated from each other by a distance B, which is preferably about 4 to 6 ft. The solar collection tubes or solar tubes 120 are spaced apart by pitch of A, which is preferably 3 to 4 ft. The distance from the bottom of the solar tubes 120 to the plant canopy, E (C+D), is preferably about 3 to 8'. The ceiling height (floor to roof) is preferably about 14' and the solar tubes 120 typically extend below the ceiling by about 4 ft.

Figure 7:
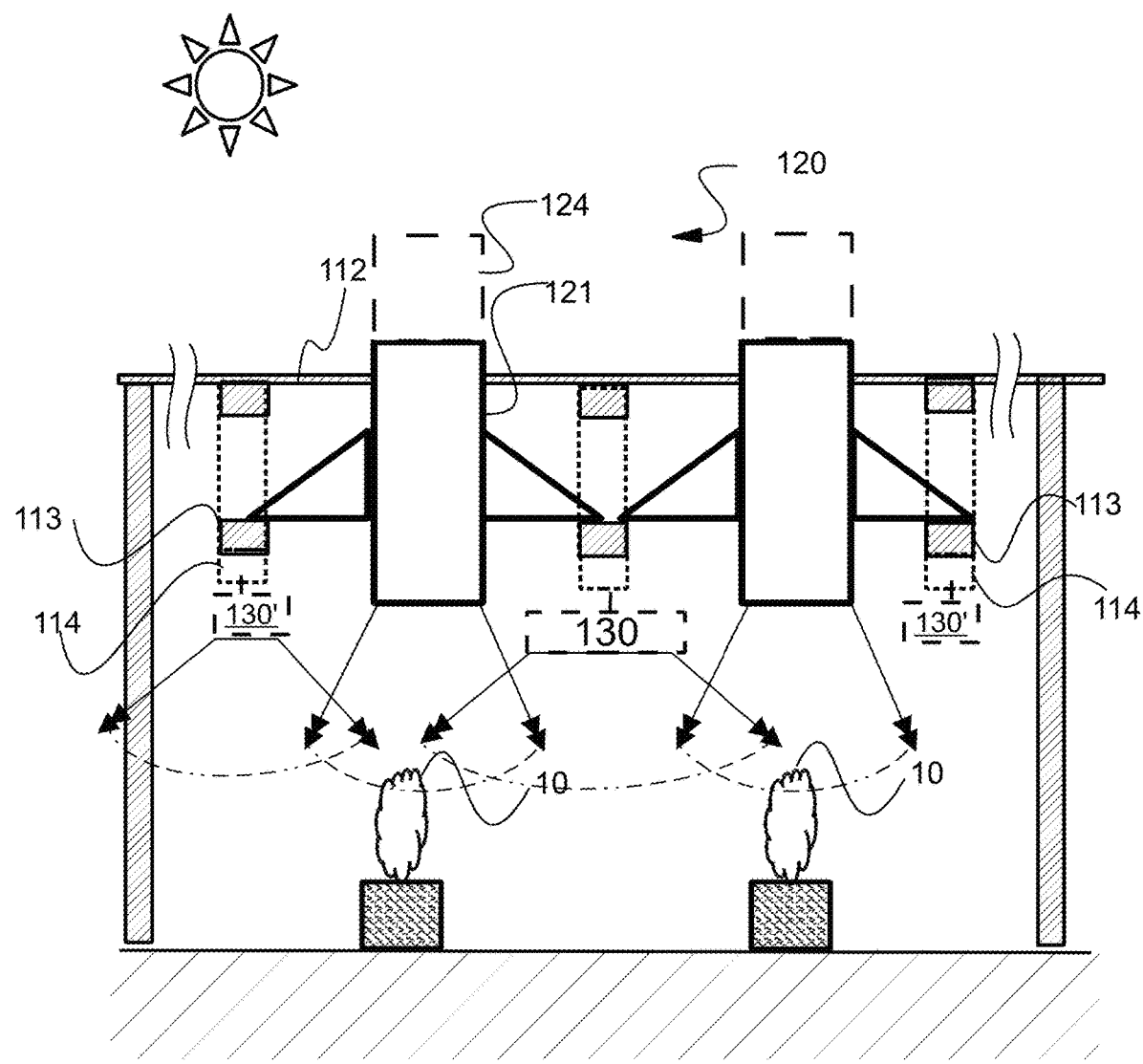
FIG. 7 is a cross-sectional elevation of another embodiment deploying the grow lights and day lighting tubes.

FIG. 5-7 illustrates a more preferred configuration for the solar collection tubes 120 and grow lamps 130 that deploy LED's 135. As the plants 10 are disposed under solar collection tubes 120 the grow lamps 130 and 130' of different shapes can be considered to be configured in alternating columns that run vertically. In a set of first columns grow lamps 130 have both red and blue light emitting LED's, which alternate with grow lamps with white light emitting LED's 130'. The white light emitting LED's are organized in the grow lamp 130' in a linear array so they diffuse light primarily transverse to the linear array's primary axis. The general region of illumination is indicated by the 4 rectangle of dot-dot-dash-dash-dash lines labeled 132.

The grow lamps 130 with blue and red light emitting LED's diffuse the emitted light over a wider range indicated by dot-dot-dash line 131 to illuminate a region that spans to laterally to a set of second columns that contain only end to end oriented grow lamps with linear arrays of white light emitting LED's 131'. The first and seconds sets of columns are interlaced in that but for the columns adjacent the walls, each columns of the first or second set has as the near column on the opposing side the column of the other set. The grow lamps 130 also project the emitted light red and/or blue light vertically about the length of 2 adjacent white LED grow lamps 130'. Accordingly the arrayed grow lamps 130 and 130' project emitted light over same area of the growing space that is also illuminated by sunlight from the solar collection tubes or solar tubes 120.

FIG. 6 is an enlarged version of a related embodiment to FIG. 5 to illustrate the overlapping illuminated regions 131 and 131' associated with the red/blue light emitting grow lamps 130 and the white light emitting grow lamps 130'. It should be noted that in the embodiment of FIGS. 4 and 5 the majority of the grow lamps are the white light emitting LED grow lamps 130', being about 3 to each of the one red and blue light emitting LED grow lamps 130.

FIG. 7 is a sectional view through the solar collection tubes 120 in FIGS. 5 and 6 showing an adjacent column of the second set to indicate the position of the solar collection tubes 130 and plants 10 relative to the alternating red/blue light emitting grow lamps 130 and white light emitting LED's 130'. The solar collection tubes 120 also most preferably deploy a collector 123 at the top of the central tube portion 121. The collector 123 may extend above the roof 112. The grow lamps 130 or 130' can be mounted to the building rafters 113 by rails 114, and be rolled along the rails by drive motors thereon that are in signal communication with the controller 140 in this or any other embodiment.

FIG. 8 is an alternative embodiment corresponding to the view in FIG. 7 in which the solar collection tubes 120 utilizes both the collector 123 at the top of the central tube portion 121 of the light pipe 120 and the wide spatial and angular diffusion pattern provided by the amplifier 124 at the exit orifice of the central portion 121 of the light pipe 120.

Figure 9:
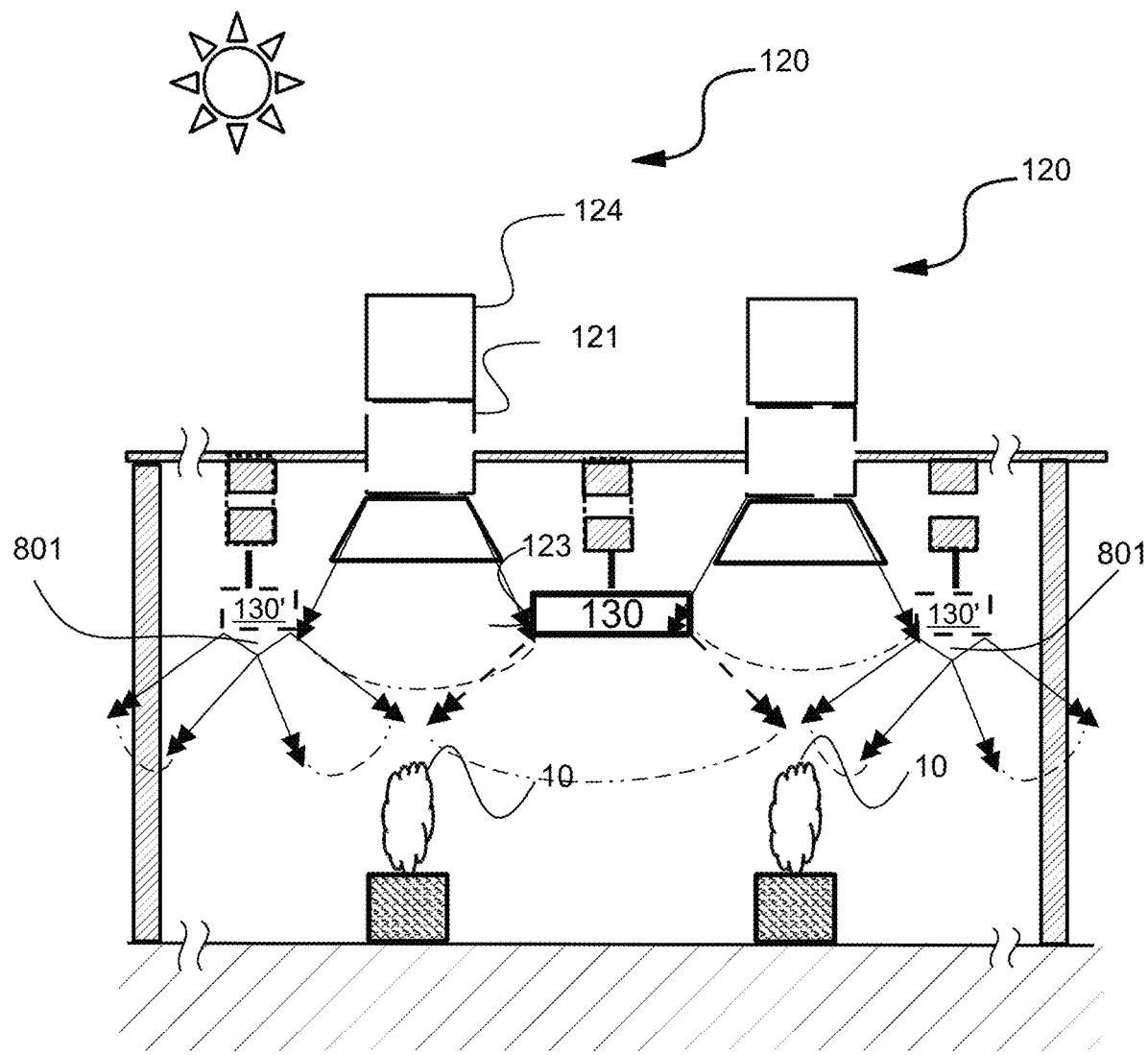
FIG. 9 is a cross-sectional elevation of another embodiment deploying the grow lights and day lighting tubes.

FIG. 9 is another alternative embodiment corresponding to the view in FIGS. 7 and 8 in which the solar collection tubes 120 utilizes both the collector 123 at the top of the central tube portion 121 of the light pipe 120 and the wide spatial and angular diffusion pattern provided by the amplifier 124 at the exit orifice of the central portion 121 of the light pipe 120. The central tube portion 121 is illustrated as shorter than in FIGS. 7 and 8, as the collector 123 and amplifier effectively extend the light pipe 120.

By linear array we mean an array of LED lights 135 in which the individual LED's are aligned in one or more rows that extend in primary direction in which the length of the arrayed LED's in the primary direction is longer than the width in a second direction transverse to the primary direction. The arrayed LED's include multiple adjacent rows of LED's that extend in the same direction. In such linear arrays, the length is preferably at least 5 times the width, but more preferably at least 20 times the width, and most preferably at least 100 times the width. It should be noted in the columns of white light emitting LED grow lamps 130' in FIGS. 4 and 5, the primary direction defined by the LED's is aligned with the column direction.

By rectangular arrays of LED's, we mean any such array where the aspect ratio of the primary direction length to the width is between about 0.2 to about 5, but more preferably about 0.33 to 3, and most preferably about 0.5 to about 2.0.

As shown in FIG. 3-5, a rectangular grow lamp 130 may be placed between a cluster of four solar collection tubes 120. Then, in between adjacent clusters of four solar collection tubes 120, one or more linear grow lamps 130' are arranged in rows. Alternating rows dispose the rectangular grow lamps between adjacent linear grow lamps 130'. Such a growth lamp 130 is configured to illuminated 4 adjacent plants that are placed generally under the solar collection tubes 120.

Plant Needs

The effective hours of sunlight and the intensity of sunlight in each of the effective ranges of the solar spectrum for optimum productivity varies with growth stage as listed in Table I.

Table I is an example of the target hours of light and the desired energy spectrum desirable for plant growth over stages of plant and fruit or flower development. The energy spectrum parameters of Table I are particularly preferred for the optimal cultivation of *Cannabis* plants, including hemp, as an example of the target ranges that are used in process steps 2050 to determine a compensation factor in each spectral band, with the effective hours per day used to calculate the optimal compensation time and power for the grow lights 130 (step 2060).

*Cannabis* has 5 main stages of growth that are accounted for in the process 2000: vegetative, pre flowering, fruit set, swell, and harvest. Vegetative stage is the stage before flowering stages, when late spring/early summer-like conditions are most optimal, and wherein the main size and structure of the vegetative material of the plant 10 is achieved. Immediately before harvest is the last stage of the plant growth and refers to the last week or so when winter-type conditions are most optimal for achieving quality benchmarks (i.e. resin production).

TABLE I

| Description of the plant growth stage | weeks of cycle (estimates) | Effective hours per day | Target Photosynthetic Photon Flux Density (PPFD) within Bands of the Solar Radiation Spectrum | | | | |
|---|---|---|---|---|---|---|---|
| | | | Deep Red (620-700 nm) | Far Red (700-750 nm) µmols | Green (496-619 nm) µmols | Blue (380-495 nm) µmols | Total (380 nm to 750 nm) µmols |
| Vegetative growth state | 2-6 weeks | 18 | 20-200 | 0 | 40-300 | 30-400 | 90-800 |
| Pre-Flowering Growth stage | 1-2 weeks | 14 | 100-400 | 0-20 | 100-400 | 100-400 | 300-1200 |
| Fruit Set Growth stage | 2 weeks | 12 | 130-430 | 20-50 | 150-500 | 100-350 | 400-1300 |
| Swell Growth stage | 3-6 weeks | 11 | 200-400 | 50-150 | 200-500 | 50-400 | 450-1400 |
| Finish growth stage | 1-2 weeks | 10 | 50-150 | 100-300 | 200-400 | 50-300 | 350-1000 |

The Photosynthetic Photon Flux Density (PPFD) which is measured in µmoles/m$^2$/s.), is the desired or target total quantity of light at each stage of plant growth over the effective hours each day for each spectral band range or color for proper growth in each stage. It is essentially how many photons of a certain kind (PAR kind) pass through a square meter per second. The daily demand can be estimated as the product of the hours of sunlight required and the PPFD. As the actual PPFD rises in the morning hours before failing in the afternoon, calculating this product on an hourly basis and summing for each hour of the day provides a basis for determining the hourly and daily need for supplementation from grow lamps 130.

Simulation

While the PPFD is preferably measured continuously by one or more detectors 150 during actual plant 10 growth, a simulation of the PPFD in a given location can be helpful in determining the expected electrical power use of the grow lamps 120 to supplement the PPFD to the levels in Table I.

FIGS. 10 to 13 plot aspects of the predicted hourly change in total sunlight at the plants canopy height as PPFD using simulation software available from Solatube International, Inc. (Solatube Design Calculator 2.0) for a theoretical facility in Albany, N.Y. that was configured as follows with the Solatube brand Skyvault M74 (with Collector and Amplifier):

Room Size (L×W×H) in ft: 12×18×14
Ceiling Height (ft.) 14
Suspension Height (ft.) 4
Target Plant Canopy Height (ft.) 6
Light Pipe 120 spacing (L×W in ft.) 3×4

The software is capable of predicting instantaneous sunlight flux throughout the different positions within the room and takes into account fluctuations in weather conditions through the year, and the changes in solar elevation and azimuth throughout the day for the location selected. The software calculates hourly average for each month, and the high and low values for each hour that might be encountered over the month.

Figure 10:
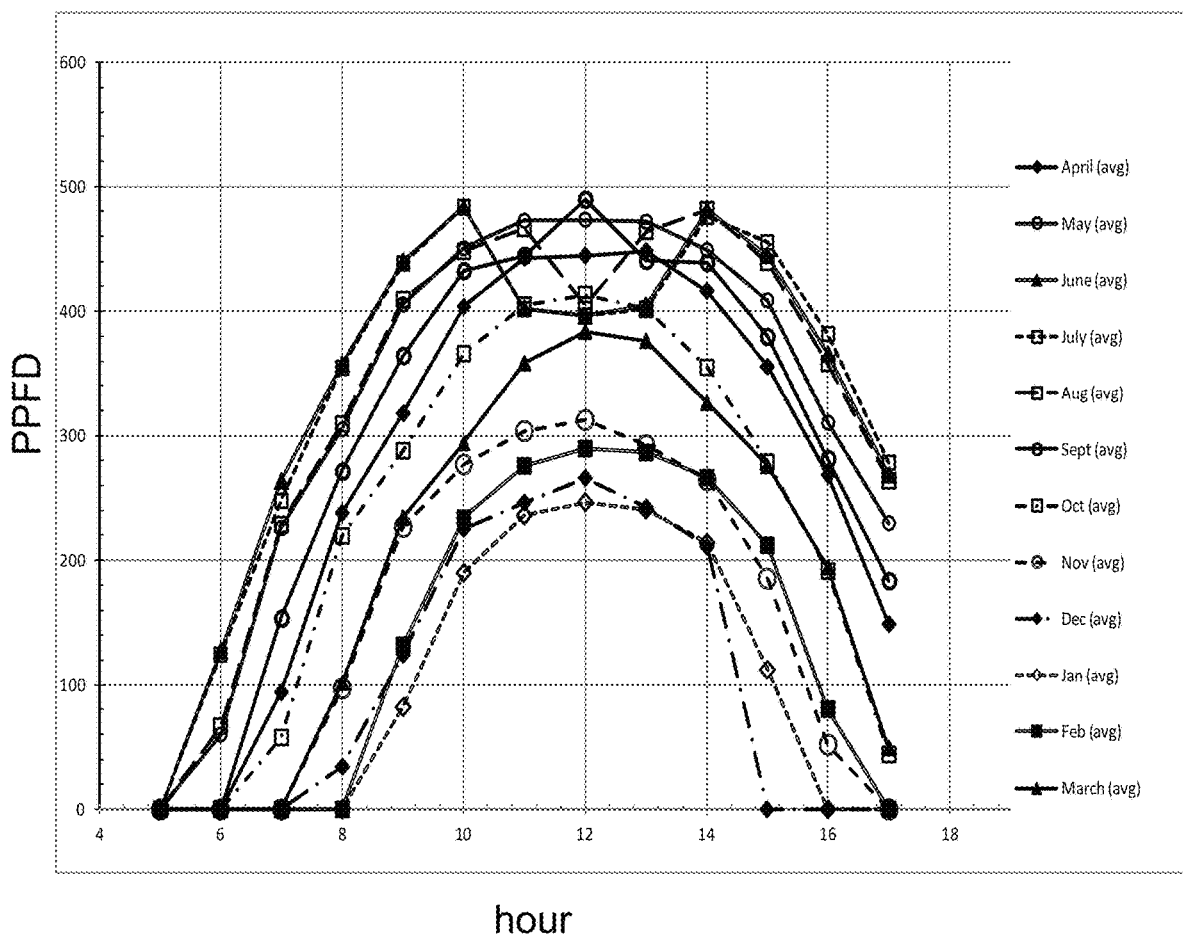
FIG. 10 is a plot of the calculated PPDF at plant canopy height of 6 ft. over the daylight hours for a preferred arrangement of solar collection tubes as a monthly average throughout a year.

FIG. 10 plots the average PPFD across all spectral bands at the plant growth height or top of the canopy for each month by the hour. As expected, the average is higher closer to the summer solstice in late June (June 20 or 21), and lower closer to the winter solstice in late December (December 21 or 22).

Figure 11A:
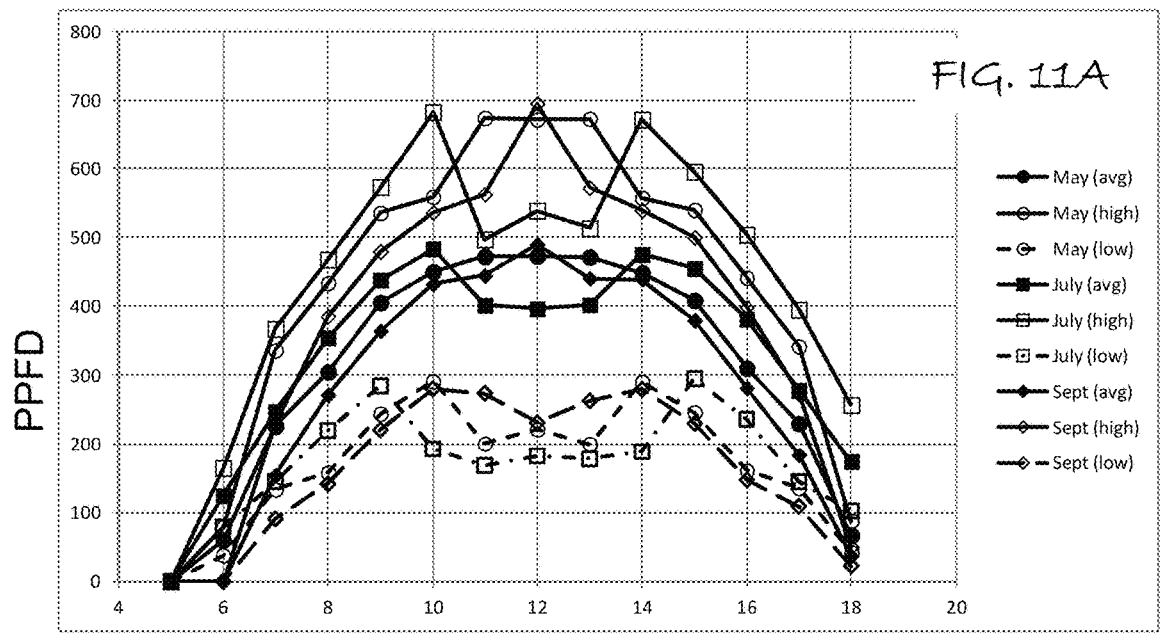
FIG. 11A is a plot of the calculated PPDF at plant canopy height 6 ft. over the daylight hours for a preferred arrangement of solar collection tubes to compare the monthly average with the high and low values for each hour for the months of May, July and September.
Figure 11B:
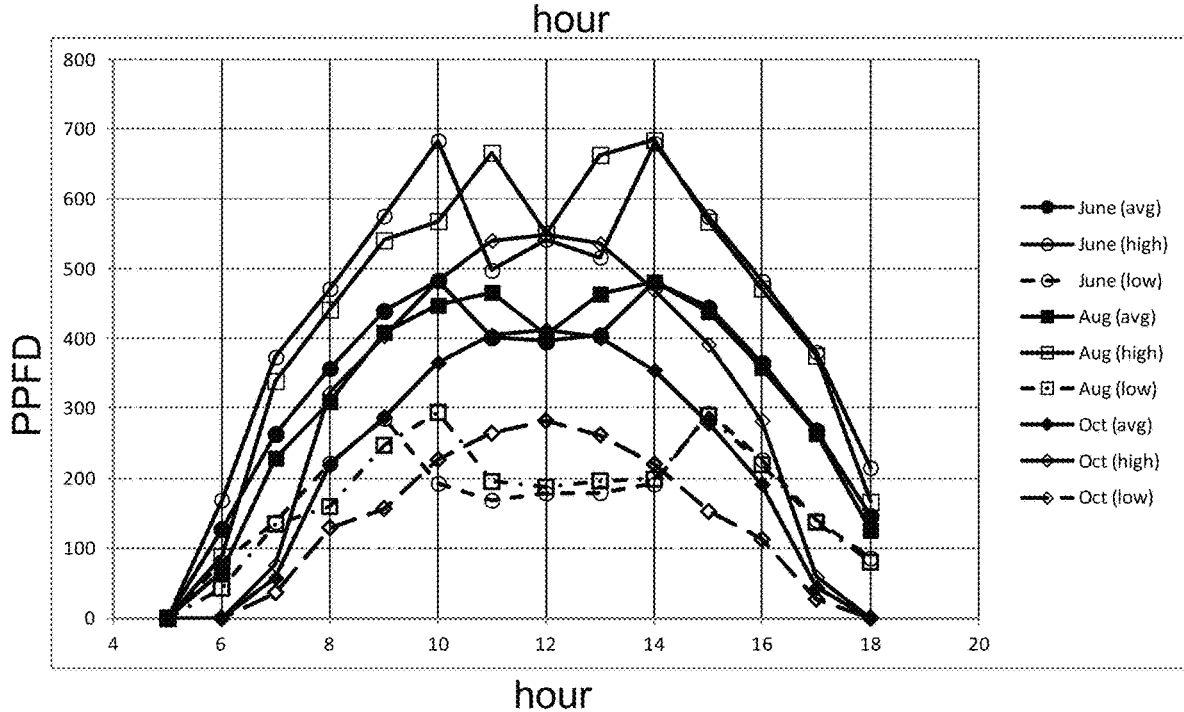
FIG. 11B is a plot of the calculated PPDF at plant canopy height 6 ft. over the daylight hours for a preferred arrangement of solar collection tubes to compare the monthly average with the high and low values for each hour for the months of June, August and October.

FIGS. 11A and 11B compare the high, low and average sunlight collected for each hour over each of May, July and Aug. (in FIG. 12A) and June, Aug. and Oct. (in FIG. 12B).

The Solatube brand Skyvault M74 has some loss in efficiency when the between about 11:00 to 13:00 (11 am to 1 pm) for the mid summer months of June, July and Aug. when the sun is closest to the zenith at noon. However, although the sun is at a slightly lower elevation at noon in May, September and October, the average sunlight collected for these hours is greater in these months, despite lower collection before 11 am and after 1 pm.

A comparison of the lowest and highest PPFD values against the average shows that weather conditions within a month can reduce the available sunlight at any hour by as much as any seasonal variation. At least in Albany, N.Y., the monthly average for any time of the day is frequently half the maximum at that time of day for the month.

Figure 12:
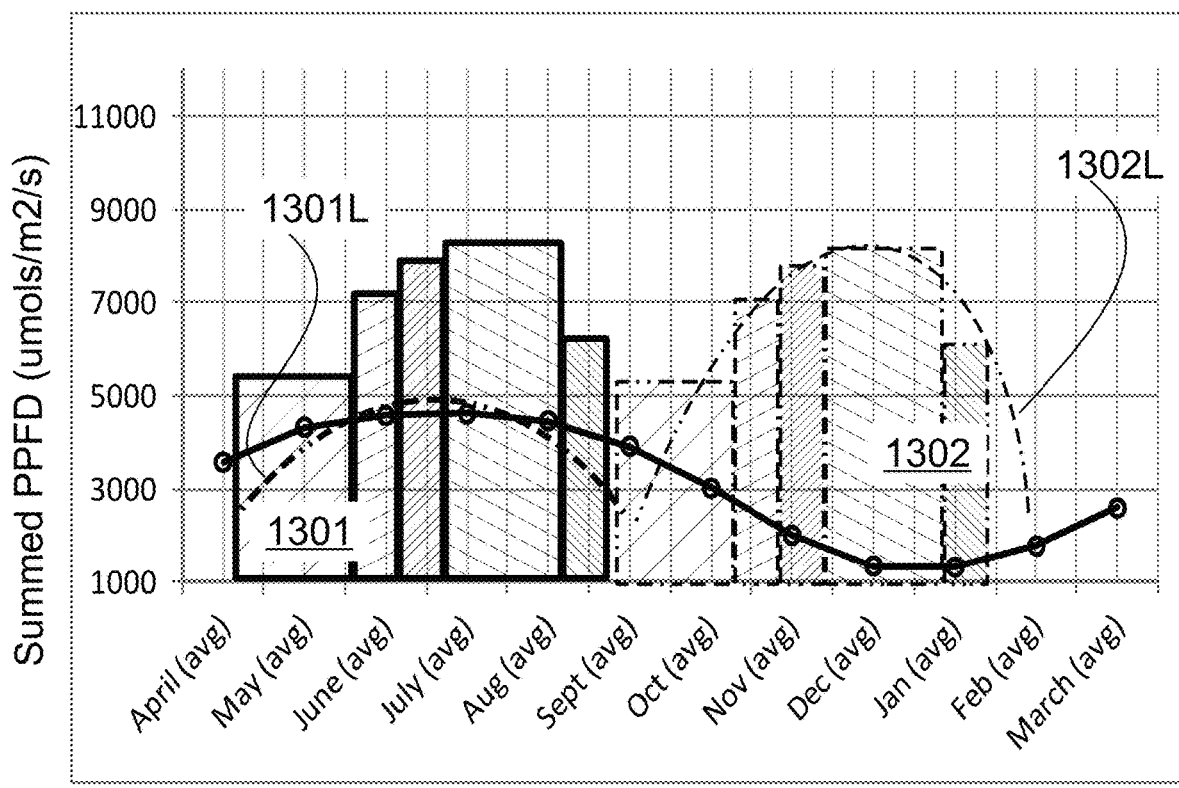
FIG. 12 is a plot of calculated cumulative PPDF at plant canopy height 6 ft. over the daylight hours against the month superimposed against an example of the desired PPDF for optimum plant growth for sequential growth cycles.

FIG. 12 is a plot of the sum of the average PPFD values for each hour against the month, compared with plant demands from Table I for 2 different growing cycles.

It should be appreciated that the use of sunlight with grow lamps 130 will be most efficient in the summer season when days are longer. In other seasons, the grow lamps 130 and more particularly the LED's 135 that emit light of different colors can be energized to make up for the shorter days relative to the growing plants need for solar energy according to the deficit in each wavelength range or spectral band in Table I.

Insofar as the date is near the summer equinox and one is near the targeted harvest date, the process 2000 using the target values of Table I results in a decrease of R (660 nm), B (420 nm) and W (5500K or otherwise) throughout the day, while increasing IR (735 nm) with the highest decrease of R/B/W at the end of the day and the highest increase of IR at the end of the day.

Control Process

In the growth environment 100 described above and illustrated in FIG. 1-9, each start of a growing cycle (step 2010 in FIGS. 13 and 14) can optimized via the processes 2000 according to the physiology and stage of plant growth at the lowest cost by utilizing what natural light in the portion of the solar radiation spectrum that reaches the plants 10 and then supplementing it with LED illumination from the grow lamps 130 to make up for deficits in the intensity of sun light and variation in spectrum relative to the plant 10 needs.. The total LED spectral distribution is modulated by the controller 140 in accordance with whatever natural light is received to emulate ideal conditions by selectively activating the desired red, green, blue and white light emitting LED's 135 to evenly illuminate the plants 10.

The methods 2000 enables the daily average ratio Red, Blue and Green light emitted by the grow lamps 130 to changes during the grow cycle of a plants 10 as the controller 140 is operative to selectively energize (step 2070) the LED's 135 to modify the absolute and relative ratio of the intensity of the output of the red and blue and white light emitting LED's. A controller 140 may also be operative to move the grow lamps 130, and hence the LED's 135 to obtain more uniform illumination from fewer grow lamps 130. The LED grow lamps 130 are preferably spaced between solar collection tubes or solar tubes 120. For example in FIG. 7, the grow lamps 130 or 130' can be mounted to the building rafters 113 by rails 114, and be rolled along the rails by drive motors thereon that are in signal communication with the controller 140.

Referring again to FIG. 12, it includes a pair of overlaid bar charts representing the growth stage in Table I. The bar chart 1301 with the solid lines is placed to overlap the time range for typical outdoor growing conditions, starting in the spring, when the overall intensity of light peaks at the summer solstice. The height of the bar represents the relative minimum solar exposure from Table I, using the product of PPFD and growing hour requirement of the plants in each stages. Stage I-V used a different hatching pattern running from left to right. In contrast, the bar chart 1302 is for a growth cycle started in September when the sunlight is decreasing in the fall requiring the a higher output of the grow lights 120, with harvest ending in about mid February. The total grow light 130 outputs in each cycle are represented by superimposed broken lines labeled 1301L and 1302L. The grow cycle starting in September (1302) would require more irradiance from the grow lamps 130 as it is essentially in reverse from the natural solar growing cycle for the northern hemisphere.

Figure 13:
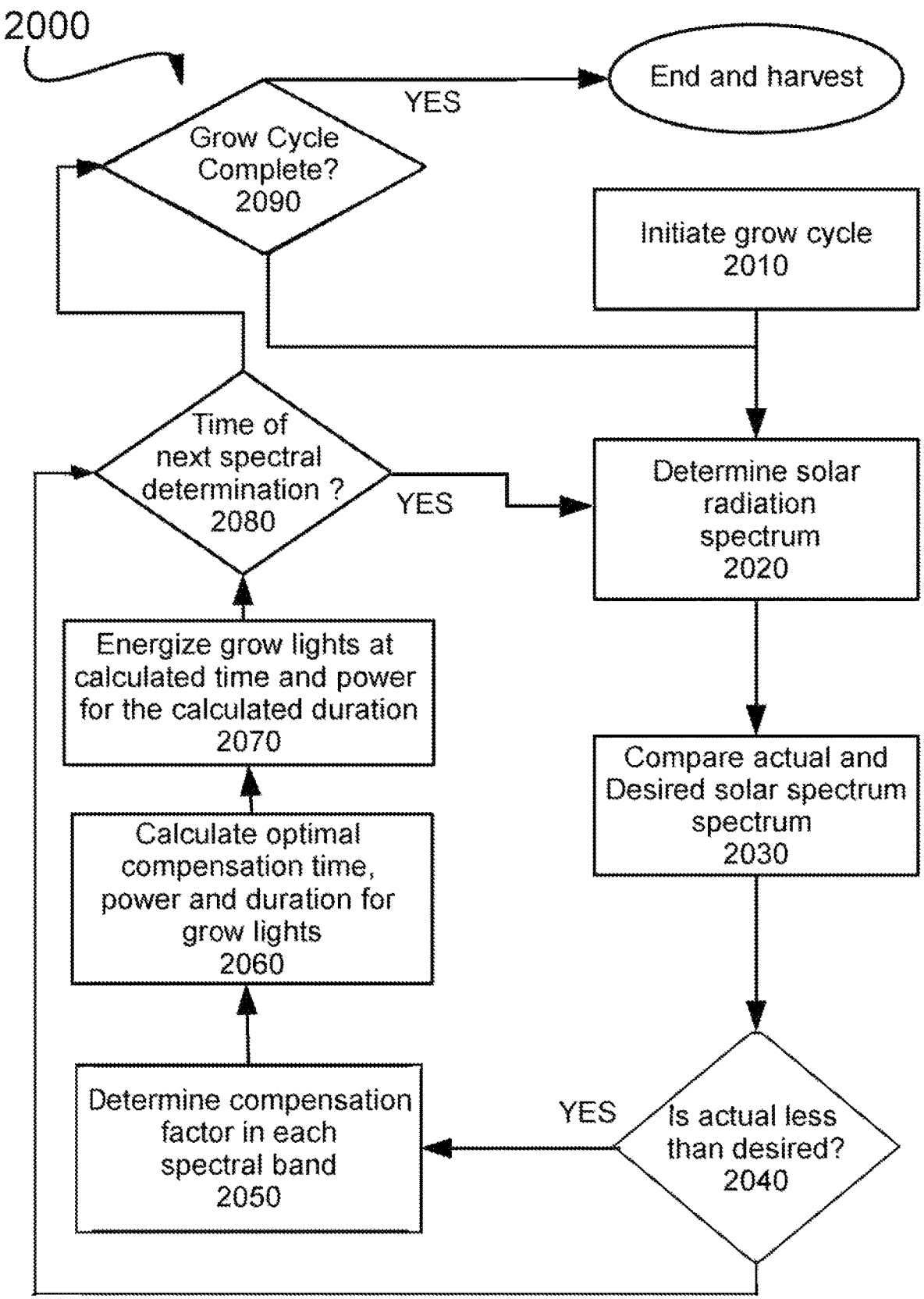
FIG. 13 is a flow chart illustrating a process of using the inventive system to supplement PPDF provided and arrangement of solar collection tubes and other daylighting means.

In the process 2000 of FIG. 13 the growth cycle is initiated in Step 2010. The solar radiation that reaches the plants 10 is then determined in Step 2020. In Step 2030 the actual spectrum is compared to the desired spectrum. In step 2040, if the actual solar radiation exceeds the desired level, the process proceeds to step 2080, in which a determination is made if the process has reach a time determined for the next spectral measurement, and if so returns to step 2020. If not, a determination is made in step 2090 if the grow cycle is complete and if so the process ends and the plants 10 are harvested.

If in step 2040, the actual solar radiation does not exceed the desired level, in the one or more spectral bands then the process proceeds to step 2050. In step 2050, the controller 140 determines a compensation factor for each spectral band. Next, in step 2060 the controller calculates an optimal compensation time, power level and duration are for the grow lights 130. Then in step 2070, the grow lights 130 are energized according to this calculation such the combinations of the LED's 135 of different colors or spectral regions provide the difference between the desired and the actual solar radiation.

Figure 14:
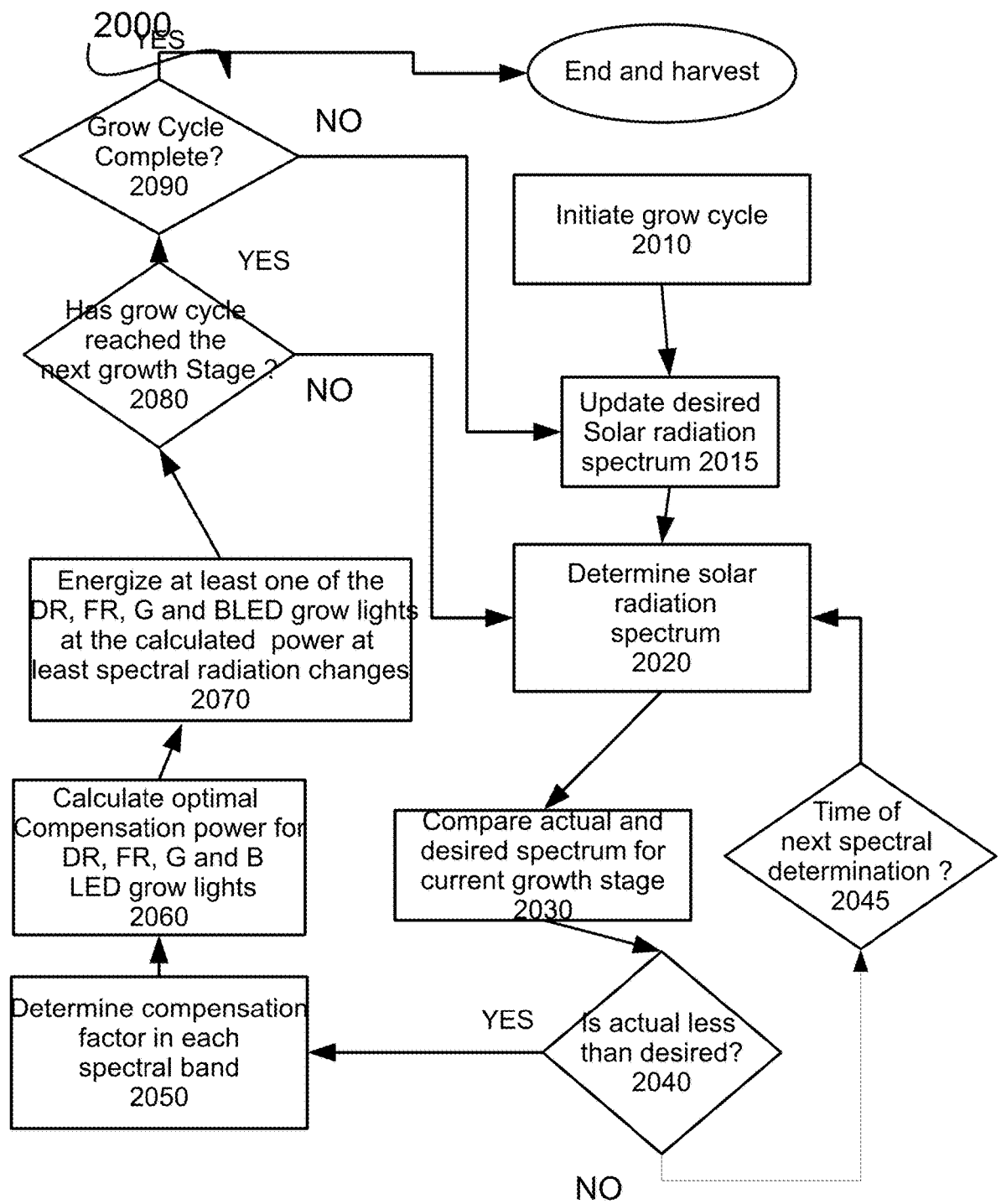
FIG. 14 is a flow chart illustrating another embodiment of a process of using the inventive system to supplement PPDF provided and arrangement of solar collection tubes and other daylighting means.

FIG. 14 illustrates a related variant of the process that deploys a step of tracking a plant growth cycle so that changes in can be made when a different stage of plant growth is reached, such as in Table I. In step 2080, the controller 140 is operative to count from the start of the process the stage of plant growth and modify the spectral characteristics in step or stage.

The quality of natural light can be measured (in step 2020) with a detector 150, which is optionally a spectrophotometer to obtain a continuous spectrum. The detector 150 is also optionally a series of detectors with narrow pass band optical filters corresponding to the wavelengths or spectral bands of interest in Table 1. When the detector(s) 150 are used, the determination by measurement can be essentially continuously in time.

In the process 2000 of FIG. 14 the growth cycle is initiated in Step 2010. Then in step 2015, the desired solar radiation spectrum is determined or provided from a setting or memory of the controller 140. In step 2020, the solar radiation that reaches the plants 10. Then in Step 2030 the actual spectrum is compared to the desired spectrum. If in step 2040 the desired spectrum is not less, then in step 2045 when the time is reached to make the next spectral determine the process returns to step 2020. As in the process 2000, steps 2050, 2060 occur when the actual solar spectrum is less than the desired level to selectively energize the grow lamps in step 2070. Then, in step 2080, accounting for the absolute time from the start of the grow cycle in Step 2010, a determination is made if the growth cycle has reached the next stage. If so, then a determination is made if the growth cycle is complete in step 2090. If the growth cycle is not complete, then in step 2015 the desired solar spectrum is updated based on the next growth stage and the process continues to step 2030.

The processes 2000 of FIGS. 13 and 14 utilize a target spectrum that includes the desired PPFD for each spectral band over a number of hours each day for each growth stage, such as in Table I. Hence, for dates nearing the winter equinox when the solar radiation spectrum gradually has less red light, step 2070 will increase output of the grow lamps 130 to provide more red light in proportion to blue light, as well as white light to boast the levels of red, blue and green light at the plant level. The highest increase will occur on the day of the equinox. It is more preferred that as the date approaches the winter equinox, the grow lamps provide an increase in Red (660 nm) Blue (420 nm) and White light (5500K or otherwise) throughout the day with the highest increase at the end of the day and/or extending the hours of energizing the grow lamps 130 to the extent they cannot make up the deficit in solar spectrum during the daylight hours.

By measuring or otherwise determining the solar radiation spectrum at the plants 10, that is the quality and quantity of natural sun light reaching the plants 10 via the solar tubes or solar collection tubes 120, on a frequent basis, the plant growth can be optimized irrespective the actual season. Preferably, these determinations (Steps 2010-2050) of quality (spectral distribution) and quantity or intensity of natural light in the solar radiation spectrum are made multiple time during the daylight hours, such as every 15 minutes, 1 hours, 2 hours, 3 hours or more, which can vary with the day length and the variation in weather conditions at a locality.

Thus, referring to the process 2000 of FIGS. 13 and 14, the quality and quantity of light provided by the grow lamps 130 can be adjusted to make up for deficiencies after a period of measurement in steps 2020 and 230 of FIG. 13, or can be adjusted very frequently in steps 2020 and 2030 as in FIG. 14, that is every few seconds or minutes to correct the light intensity and quality while the deficiency is occurring.

Such a method 2000 of using the system 100 disclosed herein provides a hybrid growth environment with the potential benefits of better energy efficiency, year round cultivation and harvest, improved plant and output quality, improved plant growth rates, more efficient use of space, and less water use compared with outdoor agriculture.

The result of the simulation presented in FIG. 9-11 has been analyzed to determine the resulting energy savings achieved by deploying solar tubes 120 with grow lights 120 in comparison to an all year round growing facility that does not use any natural light sources. It was found that for this Albany, N.Y. location the energy requirement was reduced by about half.

It is anticipated that the plants 10 can be grown in soil or hydroponic growth media, in which they are fed fertilizer with watering, using a particulate, fibrous or pure liquid growth media.

The controller 140 is operative to utilize the measured or predicted quantity and spectral character of the natural light (step 2020) received during the day, compare it with the desired quantity of light using the information in Table I (step 2030), and in coordination with a timing of the plants growth cycle, provide a schedule for selectively energizing grow lamps 130 to reach the target PPFD values in the Table I (steps 2040-2070). It has been discovered that *cannabis* plants grown by the process 2000 provide useful products in at least the same quantity and chemical composition, which includes among other aspects, the total potency of the THC and/or CBD compounds, as the same species of *cannabis* grown outdoors.

The quantity and spectral character of the natural light received during the day will vary with the season as well as daily changes in weather conditions such as from clouds, rain and/or snow fall. So it is preferred to either take actual measurements that represent the flux of light at the plants, or predict the same from a model on a frequent basis.

Insofar as weather conditions, such as clouds, fog and/or smog cover lowers overall PAR (photosynthetic active radiation) in the solar radiation spectrum, the process 2000 of FIGS. 13 and 14 will also selectively increase R (660 nm) B (420 nm) and W (5500K or otherwise) in step 2070 compensate. As clouds, rain and/or snow fall can vary the spectral distribution of light received during the day; it is most preferred to take actual measurements in the growing structures 110. However, with experience in larger operations with multiple structures, it may be sufficient to use measurement in fewer than every structure 110, as well as fewer detectors 150 in or associated with each structure 110.

The detectors 150 are preferably interspersed at the same location as the plants 10 to obtain a representative spectral profile of the illumination received by the plants. However, it is possible to use less than a detector per plant when averaging the spectral information from many detectors, making an estimation from a single outside measurement, or making an estimation from reported weather conditions, and taking into account the amount of sunlight available of the date, and accounting for any inefficiently of solar collection with the change in solar elevation during the seasons. Such detectors 150 are preferably integrating spheres disposed at the height of the plant 10 canopy and hence are preferably raised during the growing process.

It should be appreciated that in any of the embodiment the solar collection means 120 can mounted in one of the walls and roof, but is preferably limited penetration in the structure as opposed to clear glazing for the roof or walls, which in the extreme is a greenhouse. Greenhouse like structure with large expanse of glazing can be expensive to construct, and generally require significant expense in heating in harsh winter climates. If less expensive plastic films or sheeting are used as the transparent equivalent to glazing, the structure are less durable and the energy required to heat the structure in harsh conditions will be greater.

Hence, the solar collection means are preferably a collection of solar collection tubes 120 that are roof mounted and have an IR rejection means to avoid over heating from sunlight.

In other embodiment of the invention the LED grow lamps 130 in the structures 110 preferably have at least red and blue light emitting LED's, but more preferably may also include broad spectrum white light emitting LED's, Infrared LED's and green emitting LED's.

The controller 140 is operative to selectively energize the red and blue LED's 135, as well as while LEDs 135, green LED's 135 and infrared LED's 135.

In summary the controller 140 is operative to selectively modulate the LED output from the grow lamps 130 to correspond with the growing season for plants in the structure, the actual climatic season, the actual time of day, changes in the weather that minimize the solar light received in the structure as well as changes in the weather that modify the spectral balance of the light received in the structure.

Further, while preferably each of the LED based grow lamps 130 has a combination of independently energizable white, red and blue light emitting LED's 130, the system may utilize smaller but interspersed grow lamps 130 of a single wavelength, provided there are both white, red and blue LED type grow lamps 130 in the system. Combining multiple LED's of at least two different colors in a single grow lamp is advantageous in that less lamps 120 are required and it is easier to achieve uniform irradiation of the plants 10 using the patterns shown in FIGS. 4 and 5.

Given that solar tubes 120 are less efficient available sun light when the sun is at the highest elevation between about 11 am to 1 pm during June through Aug, it was unexpected that solar collection tubes 120 can reduce the energy requirements by about 50% from full artificial grow lighting. Not wishing to be bound by theory, it appears that solar tubes/solar collection tubes 120 still provide for a tremendous reduction in electrical energy needs of indoor growth facilities when properly spaced to be most effective at uniformly distributing the light collected. The manufacturers of the preferred brand of solar collection tubes 120 did not at the time of the invention recommend them for agricultural applications, as they are intended to provide the feeling and ambiance of the natural light spectrum for human occupants in the area, and do not produce the same intensity of natural sunlight, which is only possibly close to windows for a portion of the day.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A plant growth environment comprising:
   a) a structure with vertical sides and a roof spanning the sides, where a portion of space between the vertical sides and the roof provides an interior volume for plants to grow,
   b) a plurality of solar collection tubes mounted in the roof for collecting sunlight and directing the sunlight downward into the interior volume,
   c) a plurality of grow lamps that deploy multiple light emitting diodes (LED's) that are configured to illuminate the interior of the volume to supplement the sunlight directed into the interior volume by the solar collection tubes, in which the grow lamps are disposed between adjacent solar collection tubes to illuminate plants placed generally under the solar collection tubes,
   d) a controller operative to energize the LED's in response to fluctuations in the sunlight delivered to the plants by the solar collection tubes and a target energy spectrum desirable for the growth of the plants over stages of plant and fruit or flower development.

2. The plant growth environment of claim 1 further comprising one or more detectors that measure the sunlight intensity and the controller is in signal communication with the one or more detectors.

3. The plant growth environment of claim 2 wherein at least one detector is within the interior volume.

4. The plant growth environment of claim 2 wherein the solar collection tubes are operative to reject a substantial portion of the infrared radiation in the sunlight and direct the visible light radiation of the sunlight into the interior volume.

5. The plant growth environment of claim 1 in which a first portion of the plurality of grow lamps have LED's that emit white light and a second portion of the plurality of grow lamps have a combination of LED's that emit blue light and LED's that emit red light.

6. The plant growth environment of claim 5 wherein each grow lamp having white LED's is configured to illuminate 2 immediately adjacent plants.

7. The plant growth environment of claim 6 wherein each grow lamp having a combination of LED's that emit blue light and LED's that emit red light are configured to illuminate 4 adjacent plants.

8. The plant growth environment of claim 7 wherein the grow lamps are transportable within the structure in response to an output of the controller.

9. The plant growth environment of claim 7 wherein each grow lamp having white LED's is configured as at least one linear array of white LED's.

10. The plant growth environment of claim 9 wherein the grow lamps having white light emitting LED's are arranged in a first set of rows and the grow lamps having red and blue light emitting LED's are arranged in a second set of rows that is interlaced between the first set of rows.

11. The plant growth environment of claim 5 wherein each grow lamp having a combination of LED's that emit blue light and LED's that emit red light are configured to illuminate 4 adjacent plants.

12. The plant growth environment of claim 11 wherein the controller is operative to modulate a ratio of the intensity of the blue and red light emitted by the respective blue and red LED's in response to one or more of a change in time, a change in date and a wavelength dependent attenuation of the sunlight directed downward into the interior volume.

13. The plant growth environment of claim 5 wherein the second portion of the plurality of grow lamps that have a combination of LED's that emit blue light and LED's that emit red light include LED's that emit deep red light and far red light LED's.

14. The plant growth environment of claim 5 wherein each grow lamp having white LED's is configured as at least one linear array of white LED's.

15. The plant growth environment of claim 1 wherein one or more grow lamps are disposed to illuminate an interior of the one or more solar collection tubes.

16. The plan growth environment of claim 1 wherein the grow lamps comprise LED's that emit blue, red and white light.

17. The plant growth environment of claim 1 wherein the controller is operative to modulate a ratio of intensity of blue, red and white emitted by the LED's in response to one or more of a change in time, a change in date and a wavelength dependent attenuation of the sunlight directed downward into the interior volume.

18. The plant growth environment of claim 17 wherein one of the grow lamps and LED's are disposed to illuminate the interior of the one or more solar collection tubes.

* * * * *